United States Patent [19]
Vrinssen et al.

[11] 3,728,406
[45] Apr. 17, 1973

[54] PROCESS FOR THE PREPARATION OF 5-VINYLNORBORNENE-2

[75] Inventors: Cornelis H. Vrinssen, Geleen; Constant M. A. Cramers, Obbicht, both of Netherlands

[73] Assignee: Stamicarbon N. V., Heerlen, Netherlands

[22] Filed: Dec. 7, 1971

[21] Appl. No.: 205,753

[30] Foreign Application Priority Data

Dec. 12, 1970 Netherlands..........................7018160

[52] U.S. Cl..........................260/666 PY, 260/666 A
[51] Int. Cl...................................................C07c 5/24
[58] Field of Search................................260/666 PY

[56] References Cited
UNITED STATES PATENTS

3,183,249   5/1965   Wiese..................................260/348

*Primary Examiner*—Delbert E. Gantz
*Assistant Examiner*—Veronica O'Keefe
*Attorney*—John W. Malley et al.

[57] ABSTRACT

A process for preparing 5-vinyl norbornene-2 is disclosed, wherein butadiene is reacted with cyclopentadiene and/or dicyclopentadiene, with the reaction discontinued when no more than 50 mole percent of the (di)cyclopentadiene is converted. The process produces high efficiencies of converted raw materials into 5-vinyl norbornene-2. 5-vinyl norbornene-2 is a known compound having known use, such as, e.g., as a monomer suitable for polymerization with ehtylene and propylene into rubbery polymers.

9 Claims, No Drawings

3,728,406

PROCESS FOR THE PREPARATION OF 5-VINYLNORBORNENE-2

BACKGROUND OF THE INVENTION

U.S. Pat. No. 3,183,249 discloses the preparation of 5-vinyl norbornene-2 by a thermal Diels-Alder type reaction of butadiene and cyclopentadiene and/or dicyclopentadiene, at a temperature of 100° – 400°C, preferably 150° – 200°C, a pressure of 2 – 75 atmospheres and a reaction time of 1 – 3 hours. The cyclopentadiene:butadiene ratio preferably is within the range of 5:1 to 1:1. The process disclosed in this patent converts the (di)cyclopentadiene (as used herein, the term '(di)cyclopentadiene' refers to cyclopentadiene, dicyclopentadiene or mixtures thereof in the reaction mixture) practically 100 percent into other products, as is apparent from the statement that no dicyclopentadiene is found in the reaction mixture. From the data presented in the aforesaid patent, it also appears clear that no cyclopentadiene is present in the reaction mixture. In the present application, cyclopentadiene and dicyclopentadiene are regarded as the same substance in the calculation of the conversion of raw materials and, hence, the transformation of cyclopentadiene into dicyclopentadiene, and vice versa is not considered a conversion.

The process of the aforesaid patent results in conversion efficiencies into 5-vinyl norbornene-2 in the order of about 20 percent. As used herein, the term 'conversion efficiency' refers to the amount of converted (di)cyclopentadiene which is converted into the desired final product, 5-vinyl norbornene-2. The remainder of the converted (di)cyclopentadiene is converted into a large variety of undesired byproducts, the major portion thereof consisting of polymers, with a minor portion containing vinyl cyclohexene and bicyclononadiene. The polymeric byproducts produced by the process of the aforesaid patent may be partly converted into butadiene and cyclopentadiene by a cracking-distillation treatment, but such treatment, which involves high temperatures of the order of about 400°C or so, is characterized by serious decomposition and tar formation.

SUMMARY OF THE INVENTION 5-vinyl norbornene-2 is prepared by reacting cyclopentadiene and/or dicyclopentadiene with butadiene, with the reaction being discontinued when no more than 50 percent of the (di)cyclopentadiene has been converted. The conversion efficiency of the process is greatly improved over similar processes with higher (di)cyclopentadiene conversions.

DESCRIPTION OF THE INVENTION

If the reaction of butadiene with cyclopentadiene and/or dicyclopentadiene to form 5-vinyl norbornene-2 is discontinued when no more than 50 percent of the dicyclopentadiene has been converted, the reaction mixture consists mainly of dicyclopentadiene and the desired final product, 5-vinyl norbornene-2. Much higher conversion efficiencies into 5-vinyl norbornene-2 can be achieved, both on the basis of converted cyclopentadiene and dicyclopentadiene and upon the basis of converted butadiene. The dicyclopentadiene in the reaction product can be converted into cyclopentadiene by heating to a temperature of about 120°C to about 500°C and preferably of about 350°C to about 400°C, without serious decomposition occurring, and reused as a starting material. Alternatively, the dicyclopentadiene as such may be reused as a starting material for the process of this invention.

In the process of this invention, less 5-vinyl norbornene-2 will be formed per pass or per charge than will be the case when (di)cyclopentadiene conversions are used, such as taught by the aforesaid U.S. Pat. No. 3,183,249. Surprisingly, however, the use of the lower conversions of the present process results in the reduced occurrence of secondary reactions of 5-vinyl norbornene-2, which can lead to the formation of undesired byproducts. The conversion efficiency, therefore, of the present process is much higher than that achieved by the prior art, with conversion efficiencies of 90 percent and higher being obtainable.

It will be appreciated that the reaction time to reach the desired degree of conversion of 50 percent or lower depends upon various reaction conditons, such as temperature, pressure, ratio of reactants, presence and amount of catalyst, if any, and the like, so that no absolute reaction times can be set forth. For one skilled in the art, however, it is quite simple to determine by an orienting experiment the reaction time necessary to suit a given set of reaction conditions. In general, the reaction time will be less than 1 hour and greater than 10 minutes.

As a starting material, in addition to butadiene, dicyclopentadiene may be used, as well as mixtures of dicyclopentadiene and cyclopentadiene. However, it is greatly preferred, particularly at reaction temperatures of less than 180°C, to use cyclopentadiene as the sole starting material, other than the butadiene. The starting cyclopentadiene is soon converted into an equilibrium mixture of cyclopentadiene-dicyclopentadiene, but during the time required to attain equilibrium for this partial conversion into dicyclopentadiene, a considerable portion of the cyclopentadiene reacts with the butadiene to form 5-vinyl norbornene-2. This preferred embodiment of the present invention allows the maximum conversion efficiency into 5-vinyl norbornene-2 to be reached, under given reaction conditions, including reaction temperature and reaction time. In the preferred embodiment, wherein butadiene and cyclopentadiene are the only starting materials, it is preferred, for maximum conversion efficiencies, to discontinue the reaction when the (di)cyclopentadiene conversion is at most 25 percent. The (di)cyclopentadiene converted is principally that involved in the relatively quick reaction between cyclopentadiene and butadiene, and only a minor portion is involved in the relatively slow reaction between dicyclopentadiene and butadiene. As a result, the reaction time required to reach the desired (di)cyclopentadiene conversion is short, and the undesired secondary reactions of 5-vinyl norbornene-2, will occur only to a very small extent.

On the other hand, however, it is best not to discontinue the reaction at an excessively low conversion of (di)cyclopentadiene, due to the high cost of separating the reaction products, and possibly the conversion costs involved for converting dicyclopentadiene back into cyclopentadiene. A good economic compromise between lower conversions, and higher separation costs and the like, on the one hand, and higher efficiencies on the basis of (di)cyclopentadiene converted, on the other hand, lies in the use of a (di)cyclopentadiene conversion of 10–20 percent. If no catalyst is used, such a conversion will generally be reached after 15–30 minutes at a temperature of 140°–160°C in the presence of suitable initial concentrations of the reactants, whereas a period of only 10–20 minutes will normally be required to reach such conversions at reaction temperatures of 160°–180°C.

In the present process, the molar ratio of butadiene: (di)cyclopentadiene is preferably 0.2 to 2, more preferably 0.8–1.2, for either batch or continuous process operation. Lower amounts of butadiene result in undesirable low reaction rates. Butadiene is the cheapest of the starting materials and if more butadiene is used, the reaction will proceed more quickly and the reaction time required to reach the desired conversion will be reduced, and less 5-vinyl norbornene-2 will be lost because of secondary reactions. However, when greater amounts of butadiene is used, more vinyl cyclohexene will be formed, which makes separation of the reaction products more difficult, as the boiling point of vinyl cyclohexene (129°C at 1 atmosphere) is not greatly different from that of 5-vinyl norbornene-2 (139°C at 1 atmosphere).

The reaction can be conducted at a temperature of 100°–400°C. However, at higher temperatures the reaction is more difficult to control, and the formation of undesired byproducts is increased. Preferably, therefore, the reaction is conducted at a temperature of 100°–220°C, more preferably at a temperature of 120°–150°C. It is preferred to use a reaction pressure of 40–50 atmospheres but it is possible to use pressures which lie above and below this preferred range. For instance, the reaction pressure may vary from 2–75 atmospheres. If necessary, nitrogen or other inert gas may be used to aid in reaching the desired reaction pressure.

Although the reaction can be conducted in the gaseous phase, it is preferred to conduct the reaction in the liquid phase, especially in the presence of a suitable inert solvent. Suitable inert solvents include lower alkanols of one to six carbon atoms, such as, for instance, methanol or ethanol or the like, aryl and alkaryl compounds of six to eight carbon atoms, such as, for instance, toluene and alkanes and cycloalkanes of six to eight carbon atoms, such as, for instance, cyclohexane or heptane. Inert solvents with boiling points above that of 5-vinyl norbornene-2 can be used, but are not preferred because of the then more complicated procedure for working up the reaction mixture. The use of inert solvents generally leads to an even lower production of undesired polymeric byproducts. In addition, the use of a liquid phase reaction, especially when conducting the reaction in solution, involves the advantage of the ease of incorporating polymerization inhibitors such as hydroquinone or t-butylpyrocatechol, or reaction catalysts, such as copper or chromium salts which are soluble in the reaction mixture, such as the naphtenates or the octoates. As mentioned above, the reaction may be conducted in a batch or in a continuous manner. If a continuous process is used, it is preferred that the reaction be conducted in a so-called plug-flow reactor, although a stirred reactor can also be used.

The reaction between butadiene and (di)cyclopentadiene may be discontinued by various methods known to those in the art. The simplest method of discontinuing the reaction is to chill the reaction mixture, generally to a temperature of less than 100°C, more preferably to a temperature of about 50°C to about 70°C. Below 70°C the undesired polymerization reaction of butadiene is very slow. A temperature of 50°C is well above the boiling points of cyclopentadiene and butadiene at 1 atmosphere (41°C and –3°C respectively). Chilling the reaction mixture to a temperature not lower than 50°C facilitates the working-up procedure. It is also possible to add compounds to the reaction mixture which inhibit or prevent the reaction between the (di) cyclopentadiene and butadiene. It is possible for instance to dilute the reaction mixture with a large amount of inert solvent at the moment that the derived conversion of (di)cyclopentadiene is reached. In the use of a continuous process, of course, the simplest way of controlling the discontinuation of the reaction is to adjust the residence time in the autoclave and cool the product discharged from the autoclave to a relatively low temperature, as set forth above. If the reaction mixture is expanded to a lower pressure, such as by being passed through an expansion valve, the cooling effect will, in many instances, suffice to discontinue the reaction. It is also possible to discontinue the reaction by removing at least one of the reactants, the (di)cyclopentadiene or the butadiene. The low boiling butadiene can easily be removed by vaporization, preferably after expansion of the reaction mixture to a lower pressure. The preferred method of discontinuing the reaction is to expand the reaction mixture to a pressure of about 0.5 to about 1.5 atmospheres and to adjust the temperature to about 50°–70°C. The cyclopentadiene and the butadiene then vaporize and can be reused as starting materials. Separation of the cyclopentadienebutadiene mixture is possible, but not necessary. In such a way it is possible to retain the heat content of the reaction mixture to a large extent.

EXAMPLES OF THE INVENTION

Example 1

108 g butadiene and 0.5 g of di-t-butyl-p-cresol were heated to 140°C and a pressure of 20 atmosperes in a 1-liter autoclave with stirring while 132 g of cyclopentadiene were slowly added to the mixture. 60 minutes after the last of the cyclopentadiene had been added, the (di)cyclopentadiene conversion was 20 mole percent. Thereupon, the reaction was discontinued by cooling the autoclave contents to about 25°C. In addition to unconverted cyclopentadiene, dicyclopentadiene and butadiene, the reaction mixture contained 34.5 g of 5-vinyl norbornene-2, 4.5 g of bicyclononadiene, 11 g of vinyl cyclohexene and 9,5 g of higher boiling residue. The 5-vinyl norbornene-2 was recovered from the reaction mixture by fractional distillation. Of the (di)cyclopentadiene converted, 71.6 percent was converted into 5-vinyl norbornene-2, i.e., the conversion efficiency was 71.6 percent.

Example 2

272 g of toluene were heated in a 1 liter autoclave to 135°C, at a pressure adjusted to 40 atmospheres gauge with the aid of nitrogen, and thereafter 0.10 moles of cyclopentadiene, 1.04 moles of dicyclopentadiene and 1.48 moles of butadiene were simultaneously added to the autoclave. The autoclave contents were heated to 150°C and maintained at approximately that temperature. After 15 minutes at 150°C, 12 percent of the (di)cyclopentadiene had been converted, with a conversion efficiency of 82.6 percent. The reaction was discontinued by expanding the reaction mixture to a pressure of 1 atmosphere and adjusting the temperature to 60°C, whereby the cyclopentadiene and the butadiene vaporized and could be recovered. The 5-vinyl norbornene-2 was recovered from the remaining reaction mixture by fractional distillation.

Example 3

The process of Example 2 was repeated, using, as starting materials, 455 g of toluene, 0.20 moles of dicyclopentadiene, and 0.34 moles of butadiene, and a reaction temperature of 170°C and a reaction pressure of 40 atmospheres gauge. After 15 minutes of reaction, 6 percent of the (di)cyclopentadience had been converted, with a conversion efficiency of 90.0 percent into 5-vinyl norbornene-2. Most of the remaining 10 percent of the converted (di)cyclopentadiene appeared to be bicyclononadiene, with a virtual absence of higher boiling residue.

Example 4

463 g of toluene were heated to a temperature of 170°C in a 1 liter autoclave, and thereafter 0.295 moles of cyclopentadiene and 0.325 moles of butadiene were simultaneously added. The reaction mixture was immediately heated to a temperature of 184°C and maintained at that temperature during the course of the reaction. The reaction pressure was adjusted to 40 atmospheres gauge with the aid of nitrogen. After about 15 minutes of reaction, 20 percent of the (di)cyclopentadiene had been converted, with a conversion efficiency of 85 percent of the 5-vinyl norbornene-2. The reaction mixture contained 0.048 moles of 5-vinyl norbornene-2, 0,010 moles of bicyclononadiene, 0.020 moles of vinyl cyclohexene, 0.083 moles of cyclopentadiene, 0.078 moles of dicyclopentadiene, and 0.225 moles of butadiene.

The reaction was continued and after 45 minutes of total reaction time, 44 percent of the (di)cyclopentadiene had been converted. At that point, the reaction mixture contained 0.085 moles of 5-vinyl norbornene-2, 0.030 moles of bicyclononadiene, 0.035 moles of vinyl cyclohexene, 0.050 moles of cyclopentadiene, 0.058 moles of dicyclopentadiene and 0.123 moles of butadiene. In addition, some higher boiling residue had been formed which was not further analyzed. The conversion efficiency into 5-vinyl norbornene-2 was 66 percent.

The reaction was again continued and, after about 90 minutes of total reaction time, a (di)cyclopentadiene conversion of 60 percent was reached. At that point, the reaction mixture contained 0.090 moles of 5-vinyl norbornene-2, 0.050 moles of bicyclononadiene, 0.035 moles of vinyl cyclohexene, 0.043 moles of cyclopentadiene, 0.037 moles of dicyclopentadiene, and 0.10 moles of butadiene. The conversion efficiency into 5-vinyl norbornene-2 had dropped to 51 percent.

Example 5

The process of Example 4 was repeated, using 472 g of toluene, 0.110 moles of dicyclopentadiene, and 0.245 moles of butadiene as starting materials, and a reaction temperature of 208°C and a reaction pressure of 40 atmospheres gauge.

After 15 minutes of reaction time, a (di)-cyclopentadiene conversion of 25 percent was reached. At that point, the reaction mixture contained 0.053 moles of 5-vinyl norbornene-2, 0.025 moles of bicyclononadiene, 0.035 moles of vinyl cyclohexene, 0.010 moles of cyclopentadiene, 0.065 moles of dicyclopentadiene and 0.20 moles of butadiene. The conversion efficiency was 66 percent. The reaction was then continued at the same reaction conditions. A (di)cyclopentadiene conversion of 50 percent was reached after about 30 minutes of total reaction time. At that point, the reaction mixture contained 0.075 moles of 5-vinyl norbornene-2, 0.065 moles of bicyclononadiene, 0.040 moles of vinyl cyclohexene, 0.010 moles of cyclopentadiene, 0.035 moles of dicyclopentadiene and 0.065 moles of butadiene. The conversion efficiency into 5-vinyl norbornene-2 had decreased to 53 percent.

The reaction was continued to a total reaction time of 75 minutes, at which point 80 percent of the (di)cyclopentadiene had been converted. At that point, the reaction mixture contained 0.040 moles of 5-vinyl norbornene-2, 0.133 moles of bicyclononadiene, 0.005 moles of cyclopentadiene and 0.020 moles of dicyclopentadiene, and the conversion efficiency into 5-vinyl norbornene-2 had dropped to only 23 percent.

Example 6

In a continuous process, cyclopentadiene and butadiene, in a molar ratio of 1:0.97 respectively, were introduced into a 1-liter autoclave. The flow rate was adjusted to a residence time, in the autoclave, of 34 minutes. The temperature and pressures were maintained constant at 170°C and 40 atmospheres gauge. The continuous reaction was conducted for 1 week, during which time 37 percent of the cyclopentadiene passing through the autoclave was converted (not counting the conversion of cyclopentadiene into dicyclopentadiene). The conversion efficiency was 63 percent into 5-vinyl norbornene-2, which was recovered from the reaction mixture by fractional distillation.

Example 7

Example 6 was repeated, but with a cyclopentadiene:butadiene molar ratio of 1:2.0, a residence time in the autoclave of 15 minutes, and a reaction temperature of 150°C. The continuous process was operated for 1 week, converting 22 percent of the (di)-cyclopentadiene with a conversion efficiency of 96.1 percent into 5-vinyl norbornene-2.

What is claimed is:

1. In a process for preparing 5-vinyl norbornene-2, said process comprising reacting butadiene with cyclopentadiene and/or dicyclopentadiene at a temperature of about 100°–400°C, the improvement comprising discontinuing the reaction when the conversion of (di)cyclopentadiene is no greater than about 50 percent, whereby the efficiency of converted raw material into 5-vinyl norbornene-2 is improved.

2. The process as claimed in claim 1 wherein the reaction product of said reaction is at least partly separated into components thereof, one of said components being 5-vinyl norbornene-2 and another of said components being dicyclopentadiene.

3. The process as claimed in claim 2, wherein said dicyclopentadiene separated from said reaction product is at least partly converted into cyclopentadiene by heating to a temperature of about 120°C to about 500°C, and the resulting cyclopentadiene is used as a starting material for said process.

4. The process as claimed in claim 1 wherein butadiene is reacted with cyclopentadiene.

5. The process as claimed in claim 4 wherein said reaction is discontinued when the conversion of (di)cyclopentadiene is at most 25 percent.

6. The process as claimed in claim 5 wherein the reaction is discontinued when the conversion of (di)cyclopentadiene is 10 – 20 percent.

7. The process as claimed in claim 1, wherein the reaction is at a pressure of about 2 to about 75 atmospheres.

8. The process as claimed in claim 1, wherein the reaction is discontinued by expanding the reaction mixture to a lower pressure and removing butadiene by vaporization.

9. The process as claimed in claim 8, wherein the reaction is discontinued by expanding the reaction mixture to a pressure of about 0.5 to about 1.5 atmospheres and adjusting the temperature to about 50°C to about 70°C.

* * * * *